3 Sheets—Sheet 1.

T. ROBJOHN.

Apparatus for Making Ruffling.

No. 1,556. Reissued Oct. 27, 1863.

Witnesses:
Jno. Coombs.
Geo Reed

Inventor:
T. Robjohn.
per Munn & Co
attorneys.

N. PETERS, Photo-Lithographer, Washington, D. C.

3 Sheets—Sheet 2.

T. ROBJOHN.

Apparatus for Making Ruffling.

No. 1,556. Reissued Oct. 27, 1863.

Witnesses:

J. W. Coombs

Geo Reese

Inventor:

T. Robjohn per Munn & Co

Attorneys

N. PETERS, Photo-Lithographer, Washington, D. C.

3 Sheets—Sheet 3.

T. ROBJOHN.

Apparatus for Making Ruffling.

No. 1,556. Reissued Oct. 27, 1863.

*Witnesses:*

J. W. Coombs.
Geo Reed

*Inventor:*

T. Robjohn
per Munn & Co
attorneys.

N. PETERS, Photo-Lithographer, Washington, D. C.

UNITED STATES PATENT OFFICE.

EMMA C. WOOSTER, OF NEW YORK, N. Y., ASSIGNEE OF THOMAS ROBJOHN, OF SAME PLACE.

IMPROVEMENT IN APPARATUS FOR MAKING RUFFLING.

Specification forming part of Letters Patent No. 39,328, dated July 21, 1863; Reissue No. 1,556, dated October 27, 1863.

*To all whom it may concern:*

Be it known that I, EMMA C. WOOSTER, of the city, county, and State of New York, obtained by virtue of an assignment from THOMAS ROBJOHN, of the city, county, and State aforesaid, Letters Patent of the United States for a Machine for Making Ruffles, the invention of said ROBJOHN, which Letters Patent were dated July 21, 1863, and numbered 39,328; and I do hereby declare that the following is a full, clear, and exact description of the said invention, reference being had to the accompanying drawings, forming a part of this specification, in which—

Figure 6:
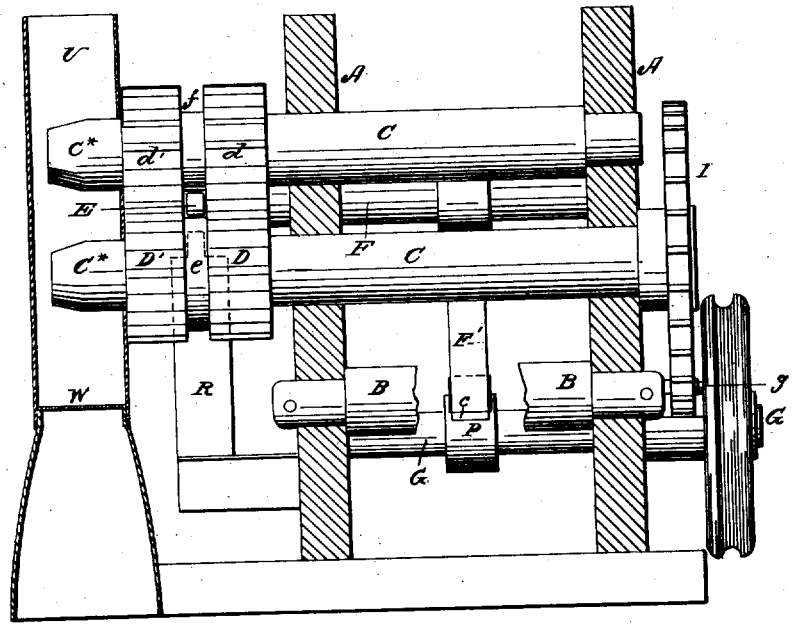
Figure 1:
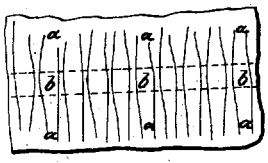
Figure 2:
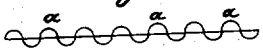
Figure 3:
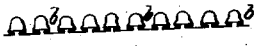
Figure 4:
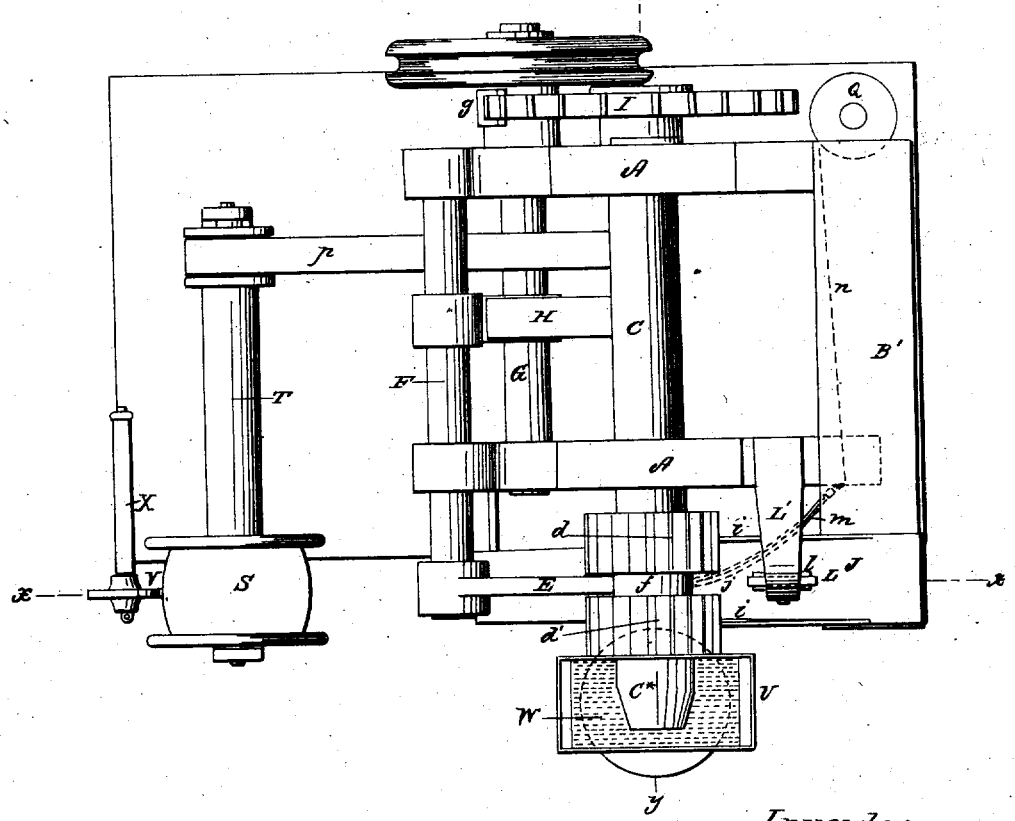
Figure 5:
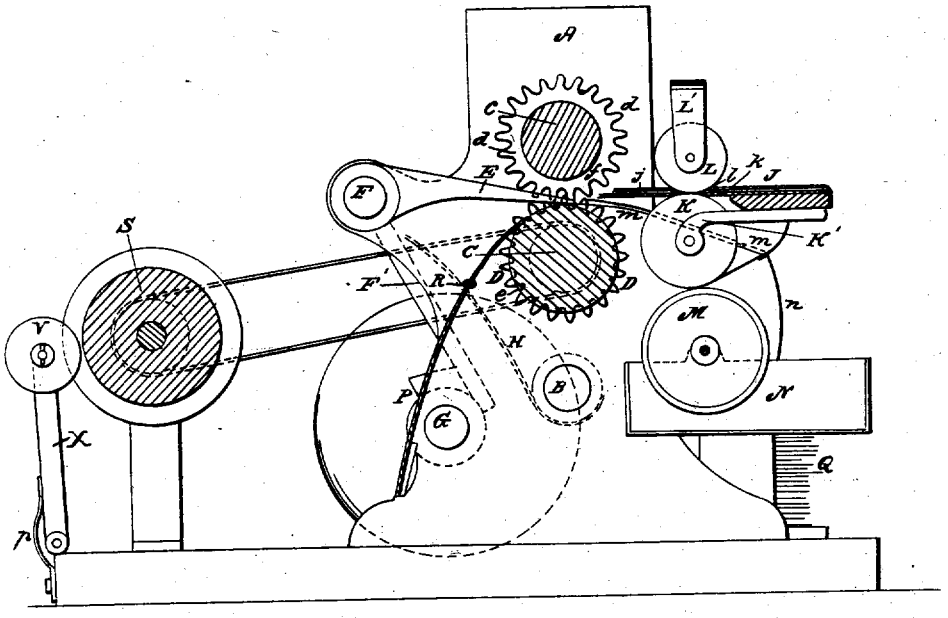

Figure 1 is a face view of a piece of ruffling made by the machine. Fig. 2 is an edge view of the same. Fig. 3 is a central longitudinal section of the same. Fig. 4 is a plan of the machine. Fig. 5 is a vertical section of the same in the plane indicated by the line *x x* in Fig. 4. Fig. 6 is a vertical section of the same in the plane indicated by the line *y y* in Fig. 4.

Similar letters of reference indicate corresponding parts in the several figures.

This machine is intended to produce ruffles with a frill at each edge, as shown at *a a* in Figs. 1 and 2, or at one edge only, and with a series of plaits forming continuations of the flutes of the frill, but flattened to present the appearance of a band, as shown at *b b* in Figs. 1 and 3.

The invention consists, first, in a novel combination of fluting-rollers and an interposed presser or folding device for the purpose of producing the frill or frills and flattened plaits at one operation.

It consists, secondly, in the employment of a stripper operating between and in combination with the fluting-rollers to detach the ruffle from the rollers in case of its adhesion thereto.

It consists, thirdly, in the employment, in combination with the fluting-rollers, of a gage to guide the strip of muslin or other material to the said rollers in such a manner as to equalize and regulate the width of the frill or frills.

It consists, fourthly, in a novel construction of the gage, whereby it is made to present the strip to the fluting-rollers in a flat and smooth condition.

It consists, fifthly, in the combination of fluted rollers, presser, stripper, and gage or guide for the manufacture of ruffles.

It consists, sixthly, in the employment of a starching apparatus, in combination with the fluting-rollers and presser, to apply starch to one side of the flattened portion of the ruffle to enable the plaits to better retain their folded condition.

It consists, seventhly, in certain means of delivering a thread to one surface of the plaits in such manner that by the application of starch to the plaits the said thread may be caused to adhere to them and hold them together until they can be secured by stitching; and it consists, finally, in a certain mode of heating the fluting-rollers by the flame of gas or of a lamp.

To enable others skilled in the art to make and use the machine, I will proceed to describe its construction and operation.

A A are two standards, united by cross-bars B B′, to constitute the framing of the machine. C *c* are the shafts of the fluting-rollers D D′ *d d′*, arranged horizontally one above the other in suitable bearings in the standards A A. The rollers, two upon each shaft, are arranged outside of one of the standards A A, and arranged in pairs one above another, D *d* constituting one pair, and D′ *d′* the other, and the two pairs are arranged at a distance apart a little greater than the desired width of the central flattened or plaited portion of the ruffling. The rollers are constructed substantially like ordinary fluting-rollers, and those of each pair have their fluting-ridges rounded off slightly at the ends next the other pair, as shown in Figs. 4 and 6, to prevent them from cutting the fabric. Between the two lower rollers, D D′, there is provided on the shaft C a concentric cylindrical surface, *a*, the upper part of which comes slightly above the bottoms of the upper grooves of the rollers, to form a pressing-surface, upon which the flutes *c c*, produced in the fabric by the fluting-rollers, are folded down by the folding device or presser E, and flattened into plaits *b b* between the two pairs of rollers. The space between the two upper rollers, *d d′*, must be deep enough to permit the operation of the presser.

The presser E may be constructed and applied in various ways. It is represented as consisting of a flat-ended metal finger attached to a rock-shaft, F, which is arranged in suitable bearings in the standards A A behind the fluting-rollers, and its pressure upon the goods is produced by a spring, H, which is attached to the cross-piece B of the framing and bears against an arm, F′, of the rock-shaft F. The pressure thus produced is of a yielding nature, so that it will not injure the goods. The action of the presser may be either constant or intermittent; but the action of the presser represented is made intermittent, that it may have a separate action upon each flute of the ruffle as the latter is presented under it by the movement given to it by the fluting-rollers. The intermissions in the operation of the presser are produced by the action upon the arm F′ of a cam, P, on the constantly-rotating main shaft of the machine. If the operation of the presser is not to be intermittent, it may be attached directly to a stationary bearing in front of or behind the fluting-rollers.

When the presser has an intermittent action, as above described, it is desirable that the rotary motion of the fluting-rollers should also be intermittent, that the operations of the rollers and presser should alternate with each other, the presser operating while the rollers are stationary, and the rollers operating while the presser is raised and its pressure is intermitted; and hence the fluting-rollers represented have an intermittent motion, but the inmissions in the movement of the rollers are not otherwise necessary.

The movements of the rollers are produced by the operation of a single tooth, *g*, on the main shaft G, operating upon a toothed wheel, I, on the roller shaft D, the number of the teeth of the said wheel corresponding with the number of ridges in each fluting-roller, the said tooth moving the wheel to the extent of one tooth during every revolution of the main shaft, which should be at a very high velocity.

J is a stationary guide arranged in front of the fluting-rollers for conducting the strip of muslin or other material to the said rollers, composed of a flattened horizontal tube of metal of a width just sufficient for the strip to pass through it. The upper part of the said tube is slit, as shown at *i i* in Fig. 4, to form a tongue, *j*, (shown in Figs. 4 and 5,) to press upon the upper part of the strip, the width of the said tongue being such that it fits between the hems at the edges of a strip of muslin or other fabric, or between the corded edges of a piece of ribbon, and so keeps the strip or ribbon extended laterally, and causes it to be presented in a flat and smooth condition to the fluting-rollers. In the top and bottom of this guide there are central openings, *k* and *l*, for the entrance of two rollers, K and L, arranged above and below it, the lower roller, K, taking starch from a roller, M, which rotates in the starch-box N, and the upper one, L, holding the strip in contact with the lower one, K, and causing the starch to be applied all along the middle of its under surface, as it passes through the guide on its way to the fluting-rollers. The roller K is supported in a rigid arm, K′, secured to the cross-bar B′; but the roller L is supported by an elastic arm, L′, which keeps it pressed down upon the strip and presses the strip against the starched surface of K. Both of these rollers derive motion from the friction produced by the strip in passing between them. The roller M, which is supported in bearings on the sides of the starch-box, derives rotary motion from the friction of the roller K, which works in contact with it. The guide may be so adjusted laterally relatively to the space between the two pairs of rollers that the two frills on opposite sides of the flattened portion of the ruffle may be of equal or of different width.

*m* is a thread-conductor, consisting of a tube secured to one of the standards A A for the purpose of conducting a thread, *n*, (shown in blue color,) from a spool, Q, under the guide J to the surface of the collar *e* under the strip *p*, which is shown in red color in Fig. 5. This thread is kept out of contact with the strip until it has been fluted, and meets it at the point where the flattening and conversion of the central portions of the flutes into plaits takes place, and is caused by the action of the presser to adhere to the starched surfaces of the plaits. The thread thus adhering to the plaits serves to hold them together and keep them in place until they have been secured by stitching. The plaits will generally be seamed by stitching them in a sewing-machine in two parallel rows, which are dotted in Fig. 1.

R is the stripper, consisting of a flexible blade with a thin end secured to the framing of the machine behind the lower fluting-rollers, and pressing upon the surface *e* between the lower rollers, for the purpose of detaching the flute and plaited strip and the thread *n* from the said surface *e*, in case of its having been stuck thereto by the starch.

S T are two rollers by which the ruffling or frilling is taken from the fluting-rollers and delivered into a suitable receptacle as fast as it is made. The roller S is as wide as the whole width of the frilling, and secured upon a shaft, T, which is driven by a belt, *p*, from the roller-shaft C. The roller V has a narrow face to press upon the central plaited or flat part of the frilling, and is held in contact therewith by means a spring, *r*, which presses against a swinging frame, X, in which the said roller is arranged, and the said roller rotates by the friction of the frilling passing between it and roller S. The velocity of the periphery of the roller S is slightly greater than that of the surface *e* between the rollers D D′, that it may produce a slight draft upon the frilling, and so prevent it from being cockled up by the drying of the starch or by adhesion to the collar *e*.

To provide for the heating of the fluting-rollers by the flame of gas, the roller-shafts are extended beyond the outer pair of rollers, D′ *d′*, as shown at C* *c**, and made to enter openings in one side of a metal chimney, U, which is placed upon a gas-burner, W, arranged below the said extended portions of the shafts. This burner is made with a grate of wire-gauze or finely-perforated sheet metal to present a broad horizontal sheet or bed of flame. The portions C* *c** of the shafts fit the openings in the chimney in such a manner as to prevent the smoking of the rollers, and the said portions, becoming heated, impart a desirable degree of heat to the rollers.

What I claim as the invention of THOMAS ROBJOHN, and desire to secure by Letters Patent, is—

1. The combination of two pairs of rotating fluting-rollers and an interposed presser, to operate substantially as and for the purpose herein set forth.

2. The combination, with the two pairs of fluting-rollers, of an interposed stripper, operating substantially as and for the purpose herein set forth.

3. The combination of the two pairs of fluting-rollers and a gage to guide a strip of muslin or other material to both pairs of rollers, substantially as and for the purpose herein specified.

4. The flat tabular guide J, constructed with two slits, *i i*, and a tongue, *j*, substantially as and for the purpose herein set forth.

5. The combination of two pairs of fluting-rollers, a presser, a stripper, and a guide, to operate substantially as herein set forth.

6. The combination, with the guide for conducting the strip of muslin or other fabric to the fluting-rollers, of a starching-roller, K, and a pressure-roller, L, applied and operating substantially as herein specified.

7. The employment of a thread-conductor, *m*, applied and operating substantially as herein specified, in combination with the fluting-rollers and presser, for the purpose herein set forth.

8. The employment of a gas burner or lamp and chimney having the fluting-roller shafts entering the chimney, substantially as and for the purpose herein set forth.

EMMA C. WOOSTER.

Witnesses:
THOS. L. J. DOUGLAS,
GEO. W. REED.